United States Patent [19]
Horie

[11] Patent Number: 5,241,606
[45] Date of Patent: Aug. 31, 1993

[54] PERSON IDENTIFICATION APPARATUS

[75] Inventor: Ryuji Horie, Yokohama, Japan

[73] Assignee: Matsushita Electric Industrial Co., Ltd., Osaka, Japan

[21] Appl. No.: 772,321

[22] Filed: Oct. 7, 1991

[30] Foreign Application Priority Data

Oct. 11, 1990 [JP] Japan .................. 2-270372

[51] Int. Cl.⁵ .................. G06K 9/00; G01B 11/24
[52] U.S. Cl. .......................... 382/4; 356/71; 356/376
[58] Field of Search .............. 382/4; 356/71, 376; 73/105

[56] References Cited

U.S. PATENT DOCUMENTS 4,003,656  1/1977  Leventhal ................. 382/4
4,900,940  2/1990  Nakamura ................ 356/376

Primary Examiner—Leo H. Boudreau
Assistant Examiner—Jon C. Chang
Attorney, Agent, or Firm—Stevens, Davis, Miller & Mosher

[57] ABSTRACT

An apparatus and a method for identifying a person by making use of his fingerprint. The uneven fingerprint surface of a finger is scanned by a laser beam through a transparent plate. The distance between positions of the surface of the transparent plate serving as a reference surface of reflection and of the uneven surface of the fingerprint is detected as a deviation value due to the scanning. Pattern information obtained from the deviation value is indicative of undulation of the uneven surface of the fingerprint. The pattern information is collated with registered fingerprint data so as to determine whether or not the person whose fingerprint has been detected is registered or not.

3 Claims, 5 Drawing Sheets

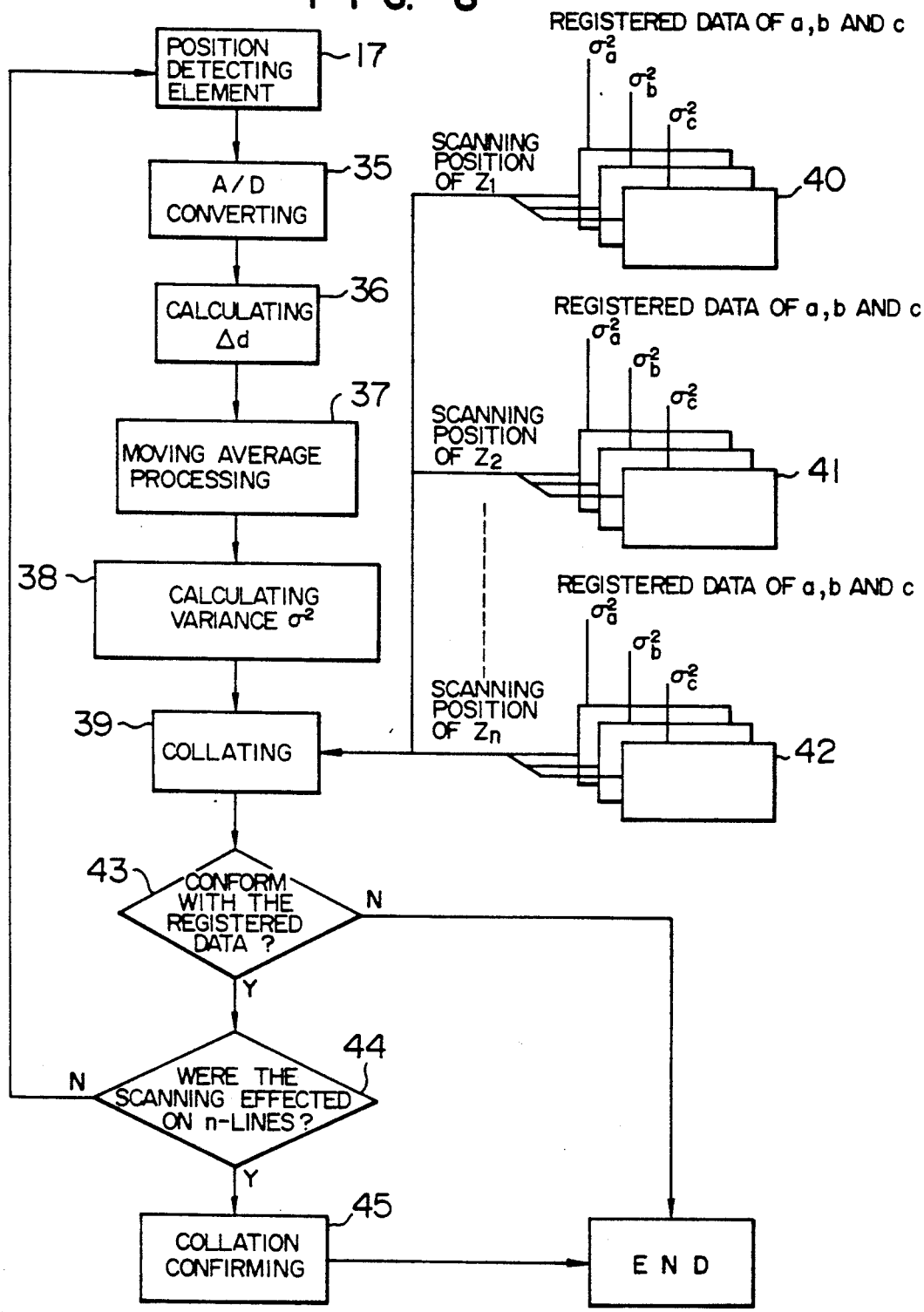

5,241,606

PERSON IDENTIFICATION APPARATUS

BACKGROUND OF THE INVENTION

This invention relates to a person identification apparatus which is used for permitting only specified persons to enter a specific room or for preventing a car from burglary or the like.

Conventional person identification apparatus are generally divided into two types one of which uses the physical information such as fingerprint, retina in the dorsal aspect of eyes, signature, voice and the like, and the other type uses cards such as magnetic cards, IC cards, radio responsive cards and the like.

In the apparatus using the physical information, the fingerprint, retina or the like is read as a pictorial image, and subjected to image processing, and collated with the personal pattern registered beforehand. Particularly, in case of the fingerprint identification, light is applied to a fingerprint so as to form shade by the reflected light, which shade is to be used as an input image. The input image is subjected to the preparation in which the fingerprint is changed into a black and white image of about 128-256 gradations with a resolution of about 512×512 picture elements, and after the smoothing and the image enhancement are effected to correct unclear portions, the binarization is carried out. Thereafter, minutiae are used as the characteristics of the fingerprint.

In the apparatus using the voice, since not only the personal information but also the contents of the talk and the feelings are included as the information, it is very difficult to extract only the personal information.

In such conventional person identification apparatus, the physical information such as the fingerprint obtained as the two-dimensional image information is a random pattern so that a very complicated image processing technique is required.

Further, although the identification apparatus using the cards is the generally used person identification apparatus at present, it is disadvantageous in that the person must carry the card and there is a possibility that the card is abused when lost.

SUMMARY OF THE INVENTION

The present invention was originated in view of the above-described technical background.

An object of the present invention is to solve at least a part of the problems encountered in the prior arts.

Another object of the invention is to provide a person identification apparatus and a method therefor which have no need of using any pattern recognition techniques based on a complicated image processing and which are not adversely affected by the reflection factor of finger which is different individually.

To this end, there are provided the following apparatus and method.

1. A person identification apparatus comprising: a laser beam source; an optical scanning system for scanning a fingerprint surface of a finger by applying a laser beam, which system serves to make the laser beam emitted from the laser beam source incident obliquely on the finger print surface; an unevenness detecting element serving to receive laser beam ray reflected from an uneven surface of the fingerprint so as to detect variation amount of relative positions of the uneven surface with respect to a reference surface; and collating means for collating output from the unevenness detecting element with registered personal data.

2. A person identification method comprising the steps of: scanning a fingerprint surface of a finger through a transparent plate by means of a laser beam; detecting the distance between the surface of the transparent plate serving as a reference surface of reflection and each position of an uneven surface of the fingerprint as a deviation value by the scanning; obtaining a pattern information from the deviation value as being in the form of undulation of the uneven surface of the fingerprint; and collating the pattern information with the registered fingerprint data so as to identify the person having the finger concerned.

According to the present invention, the fingerprint is scanned by the laser beam so that the deviation between the position on which the light is reflected in accordance with the unevenness of the fingerprint and the position on which the light is reflected from the reference surface of reflection, that is, the path obtained as a result of the scanning on the fingerprint, is changed into the pattern information which is to be used for collation with the registered data, and therefore, it is possible to obtain stable information without requiring the pattern recognition technique based on complicated two-dimensional image processing and without being affected by the variation of the intensity of the reflected ray attributable to the discrepancies in the reflection factors of the fingers of the individuals.

BRIEF DESCRIPTION OF DRAWINGS

FIG. 8 is a flow chart representing the collation process.

Throughout the drawings, the same reference numerals denote the same portions, respectively.

DETAILED DESCRIPTION OF THE INVENTION

Figure 1:
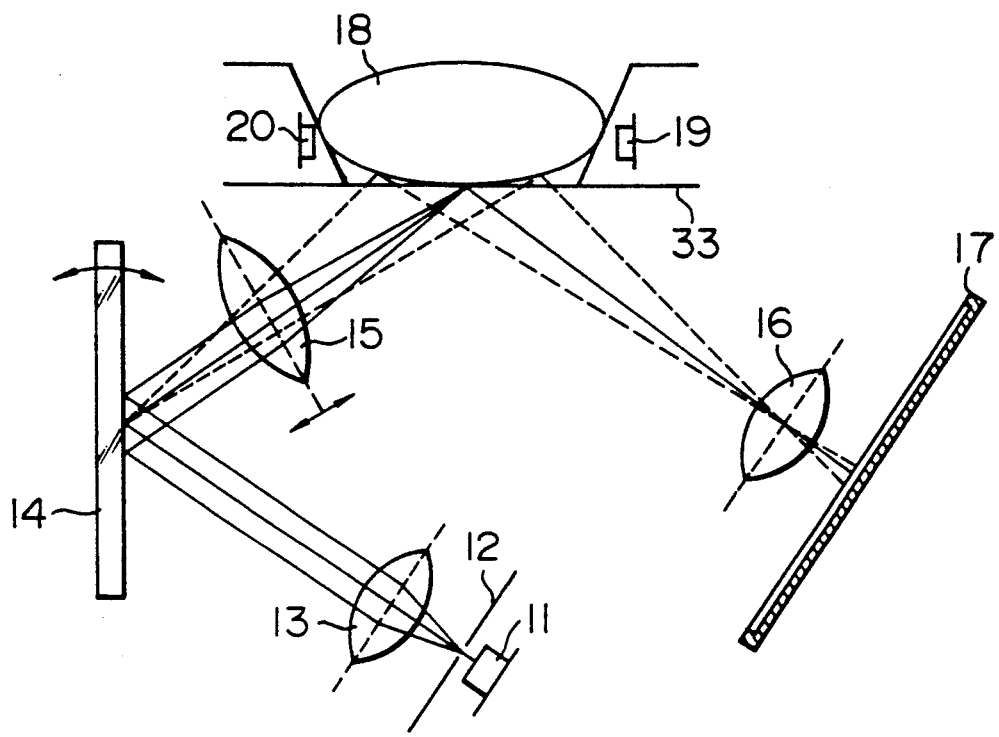
FIG. 1 is a view of an optical system of a person identification apparatus according to an embodiment of the invention.

As shown in FIG. 1, a person identification apparatus is provided with an irradiation optical system consisting of a semiconductor laser 11, a slit 12 disposed in front of the semiconductor laser 11, a collimating lens 13, a movable reflector 14 serving to make the laser beam scan on the fingerprint of a finger 18, and a condensing lens 15, and with a light receiving optical system consisting of a condensing lens 16 serving to gather the light reflected from the fingerprint on a two-dimensional position detecting element (or an unevenness detecting element) 17.

Further, the apparatus is provided with a photosensor consisting of a light emitter 19 and a light receiver 20 for detecting the existence of the finger 18.

Figure 2:
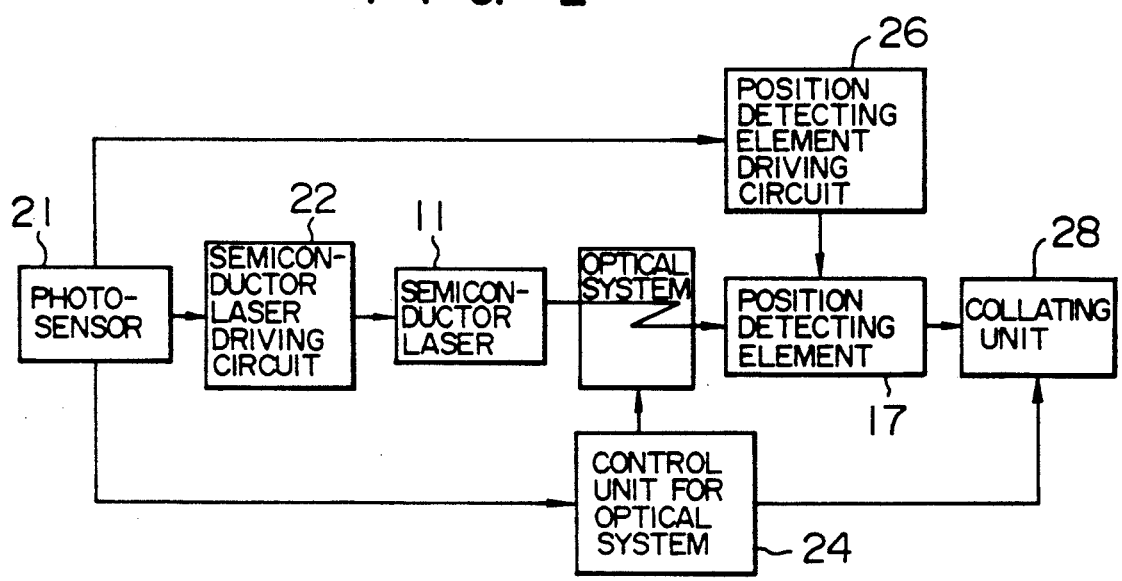
FIG. 2 is a block diagram showing an outline of the same embodiment.

As shown in FIG. 2, the person identification apparatus comprises a semiconductor laser driving circuit 22 which starts to operate according to an output from a photosensor 21 serving to confirm that the finger 18 is set in the fixed position so as to drive the semiconductor laser 11, an optical system position control unit 24 for controlling the positions of the movable reflector 14 and the condensing lens 15, a position detecting element driving circuit 26 for driving the position detecting element 17 of the two-dimensional position detecting element, and a person collating unit 28 for collating a picture signal sent out from the position detecting element 17 with the personal data.

Next, operation of the embodiment having the above-described arrangements will be described.

As shown in FIG. 1, as the finger 18 is put on, the light incident from the light emitter 19 to the light receiver 20 of the photosensor 21 is cut off so that an output is generated. This output is introduced to the semiconductor laser driving circuit 22, the optical system position control circuit 24 and the position detecting element driving circuit 26.

An output of the semiconductor laser driving circuit 22 causes the semiconductor laser 11 to emit the light beam and an output of the position detecting element driving circuit 26 causes the position detecting element 17 to start operating.

Figure 3:
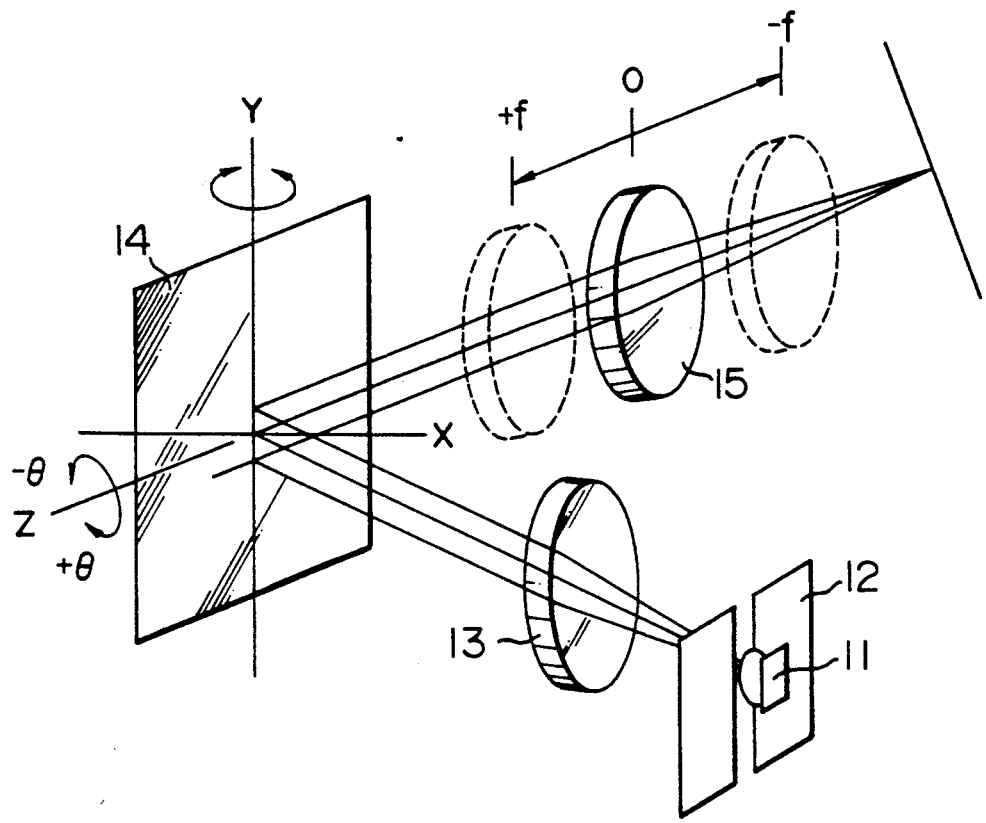
FIG. 3 is a view of an optical system used for explanation of a state in which a laser beam is made to scan on a fingerprint.
Figure 5:
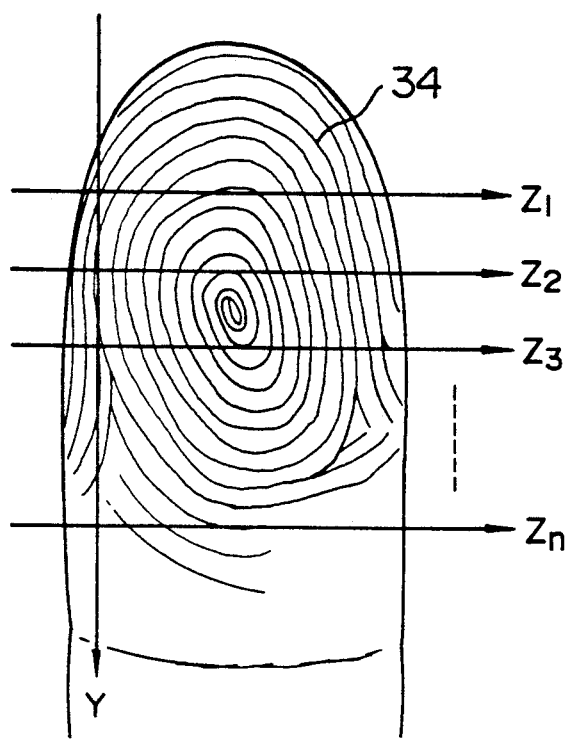
FIG. 5 is an illustration showing a state of scanning on the fingerprint.

Then, while keeping the positions of the movable reflector 14 and the condensing lens 15 under the control of the optical system position control circuit 24, the laser beam is used to scan on the fingerprint as shown in FIG. 3. Namely, by rotating the reflector 14 about y- and z-axes respectively, the scanning on the fingerprint 34 is performed two-dimensionally in the directions of y- and z-axes, as shown in FIG. 5.

Figure 4:
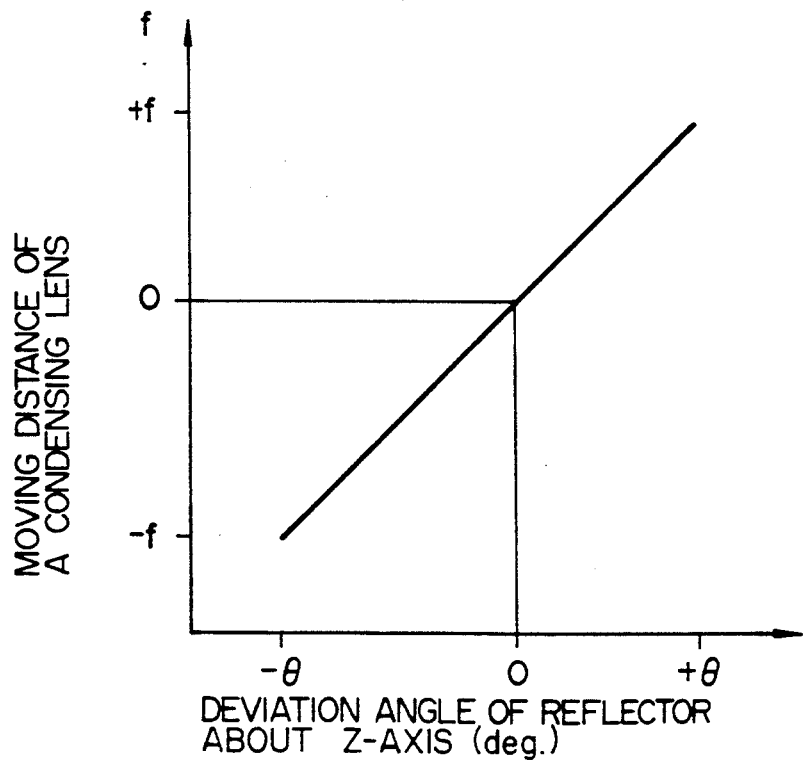
FIG. 4 is a graph used for explanation of the operation of the optical system of FIG. 3, showing the relationship between the deflection angle of a reflector and the moved distance of a condensing lens.
Figure 6:
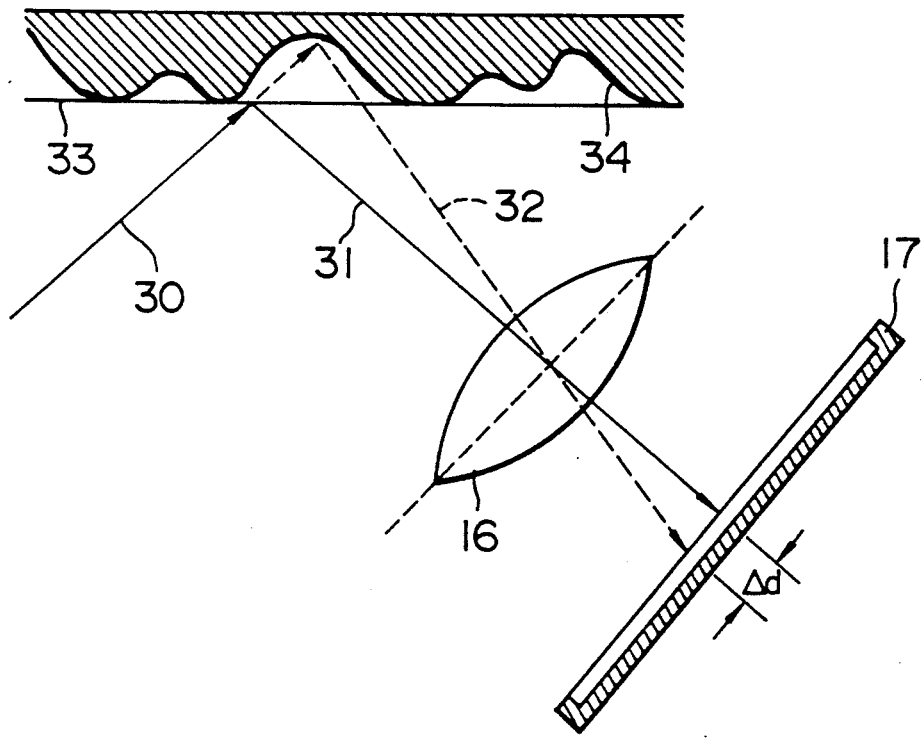
FIG. 6 is an illustration showing a manner of obtaining a displacement Δd which is the information for fingerprint identification.

In case of scanning in the direction of the y-axis, the focal point changes, the position of the condensing lens 15 is moved in accordance with the angle of deviation $\theta$ of the reflector 14 within the range of $\pm f$, as shown in FIG. 4. This makes it possible to perform the scanning in focus at any position As shown in FIG. 6, when the scanning is performed on the fingerprint 34 with a laser beam 30, there is generated a reflected ray 32 which corresponds to the inherent unevenness of each fingerprint 34. The reflected ray 32 is made to be incident on the position detecting element 17 through the lens 16.

In this case, since a reflected ray 31 of the laser beam 30 which is reflected from a reference surface of reflection of a transparent plate (such as a glass plate) 33 is discrepant from the reflected ray 32 which is reflected from the uneven surface of the fingerprint 34 on the light receiving surface of the position detecting element 17 by a discrepancy of $\Delta d$, pattern information is formed on the basis of the discrepancy $\Delta d$ thus detected, which pattern information is used as collation data.

As shown in a flow chart of FIG. 8, the data obtained by the position detecting element 17 is converted into digital data by an A/D converter 35. Then, a deviation $\Delta d$ between the digital data thus converted and the reference surface of reflection 33 registered previously is obtained by calculation in a $\Delta d$ calculating means 36.

Figure 7A:
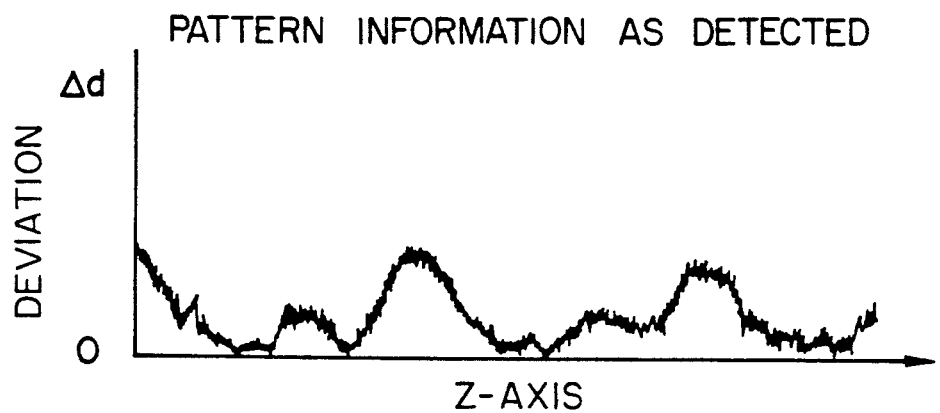
FIGS. 7A and 7B are waveform diagrams used for explanation of the signal processing.
Figure 7B:
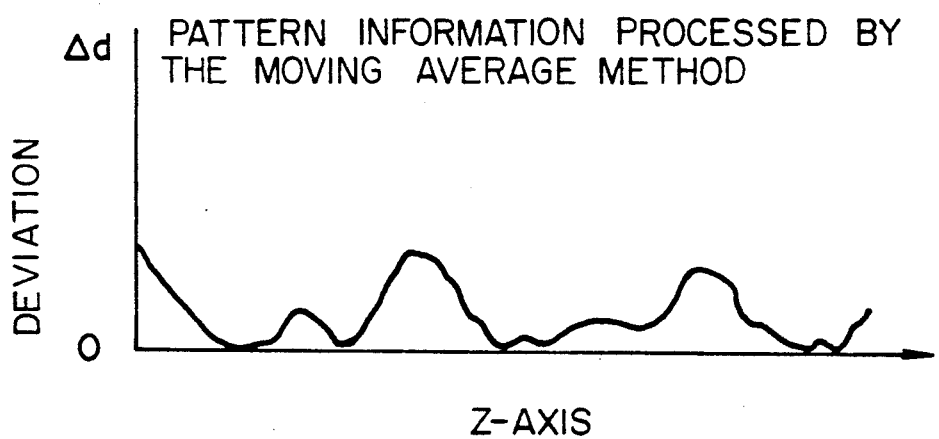

Output of the $\Delta d$ calculating means 36, which includes noise component as shown in FIG. 7A, is made to be subjected to the average processing in a moving average processing means 37 so that it is possible to obtain the data shown in FIG. 7B from which the noise component is eliminated.

A variance $\sigma^2$ for this data is obtained in a variance $\sigma^2$ calculating means 38. The variance $\sigma^2$ thus obtained is used for the retrieval of registered data 40–42 in a collating means 39. Referring to FIG. 8, the registered data 40, 41 and 42 are the fingerprint information of three persons a, b and c. Results of the scanning about scanning positions $Z_1$, $Z_2$ and $Z_n$ are previously registered in the memory as the registered data 40, 41 and 42, respectively, that is, as the variance $\sigma^2$ ($\sigma_a^2$, $\sigma_b^2$, $\sigma_c^2$) representing the fingerprint information of each person. For example, when the finger shown in FIG. 5 is scanned about the scanning position (or line) $Z_1$, the result of the scanning is calculated in the calculating means 38 so as to obtain a variance $\sigma^2$ which is collated with the registered data 40 of three persons a, b and c.

In a collating means 39, the variance $\sigma^2$ is collated with the registered data 40–42 for every scanning position.

A signal indicative of the scanning position is sent out from the optical system position control unit 24 to the collating means.

After the variance is confirmed to be coincident with the registered data 40–42 in a branch point 43 where a judgement is effected on the coincidence, it is checked in an n-line scanning judging means 44 whether or not the scanning was performed about all the predetermined scanning positions $Z_1 \ldots Z_n$. If it is not confirmed to be coincident, operation is brought to an end. The n-line scanning judging means 44 serves to confirm how many lines were scanned. If the number of repetitions of the scanning does not reach a predetermined number (n), the program is returned to operate the position detecting element 17 so that the same operation is repeated.

Thus, the scanning is performed on n lines as shown in FIG. 5 and the pattern collation is performed for each scanning position, and thereby it is possible to improve the accuracy of person identification.

When the scanning has been performed by the predetermined number of repetitions, a collation confirming unit 45 produces a signal so that a control signal is transferred to various kinds of application device such as an electronic lock for making them operate so as to unlock the electronic lock, thus completing the operation.

As will be apparent from the above, according to the present invention, it is possible to perform the person identification by the information of a locus pattern by the reflected ray without requiring any complicated image processing. Since this pattern information uses only the position information of the reflected ray, it is not adversely affected by the variation of the intensity of the reflected ray attributable to a variation in the reflection factors of the fingers of the individuals, with the result that it is possible to obtain stable information.

Further, after the noise is eliminated from the obtained data in the moving average processing means 37, the variance $\sigma^2$ is calculated in the calculating means 38. By performing such data processing prior to the collation, it is possible to reduce further the time required for the collation of the measured data with the registered data.

What is claimed is:

1. A person identification apparatus comprising:
   a laser beam source for emitting a laser beam;

an optical scanning means for scanning a fingerprint surface of a person's finger by applying the laser beam emitted from the laser beam source so as to be obliquely incident upon the fingerprint surface, said scanning means comprising a reflector rotatable about two axes that perpendicularly intersect each other and that lie on a reflection plane of the reflector, whereby an entirety of the fingerprint surface can be scanned by the laser beam, said fingerprint surface having an uneven surface;

a transparent plate with first and second opposed surfaces, said first surface comprising a reference plane on which the finger is to be placed, the transparent plate being positioned such that said second surface is disposed between the laser beam source and said first surface;

a detector means for receiving a laser beam reflected from the uneven surface of the fingerprint surface and another laser beam reflected from the reference plane so as to detect a variation of distance between the fingerprint surface and the reference plane, said detector means providing an output representing said variation of distance; and collating means for collating the output from the detector means with registered personal data.

2. A person identification apparatus comprising:

light emitting means comprising a semiconductor laser for emitting a laser beam;

an optical means, comprising a slit, a reflector and three lenses, for focusing said laser beam emitted by the light emitting means into an image and for scanning said laser beam over a fingerprint surface of a person's finger;

a transparent plate having first and second opposed surfaces, said first surface comprising a reference plane of reflection on which the finger is to be placed the transparent plate being positioned such that said second surface is disposed between the laser beam source and said first surface;

light receiving means, comprising a detecting element which receives a laser beam reflected from the fingerprint surface and another laser beam reflected from the reference plane, for detecting undulation of the fingerprint surface in accordance with a deviation between a position at which said detecting element receives said laser beam reflected from the fingerprint surface and a position at which said detecting element receives said laser beam reflected from the reference plane and for providing an output representing said undulation;

calculating means for obtaining pattern information based on said output from the light receiving means obtained as a result of said scanning on the fingerprint surface by means of the laser beam, the pattern information indicating undulation of the fingerprint surface; and collating means for collating the pattern information with registered fingerprint data.

3. A person identification method comprising the steps of:

(a) scanning a fingerprint surface of a person's finger through a transparent plate by means of a laser beam, the transparent plate being arranged between the optical system and the fingerprint surface and having two opposed surfaces, one of which is a reference plane of reflection on which the finger is placed;

(b) detecting a variation of distance between the fingerprint surface and the reference plane to obtain a deviation value based upon light reflected from the fingerprint surface and the reference plane during the scanning performed in step (a);

(c) obtaining pattern information from the deviation value, the pattern information indicating undulation of the fingerprint surface; and (d) collating the pattern information with registered fingerprint data so as to identify the person.

* * * * *